United States Patent [19]

Umeyama et al.

[11] Patent Number: 4,950,204

[45] Date of Patent: Aug. 21, 1990

[54] FLYWHEEL WITH A TORSIONAL DAMPER

[75] Inventors: Mitsuhiro Umeyama; Masaki Inui, both of Toyota, Japan

[73] Assignee: Toyota Jidosha Kabushiki Kaisha, Toyota, Japan

[21] Appl. No.: 237,296

[22] Filed: Aug. 26, 1988

[30] Foreign Application Priority Data

Aug. 28, 1987 [JP] Japan ................................ 62-130041
Aug. 31, 1987 [JP] Japan ................................ 62-131399

[51] Int. Cl.$^5$ .......................... F16D 3/14; F16F 15/12
[52] U.S. Cl. ...................................... 464/68; 74/574; 192/106.2; 464/64
[58] Field of Search ........................ 74/574; 192/106.2; 464/64, 66, 68

[56] References Cited

U.S. PATENT DOCUMENTS

| | | |
|---|---|---|
| 2,042,570 | 6/1936 | Wemp . |
| 2,437,537 | 3/1948 | Kelleher . |
| 2,729,079 | 1/1956 | Kuehn . |
| 3,266,271 | 8/1966 | Stromberg . |
| 4,002,043 | 1/1977 | Yoshida . |
| 4,220,233 | 9/1980 | Ban et al. ............................ 192/106.2 |
| 4,274,524 | 6/1981 | Nakane ............................... 464/68 X |
| 4,351,168 | 9/1982 | Prince et al. ...................... 464/68 X |
| 4,468,207 | 8/1984 | Yoshida ......................... 192/106.2 X |
| 4,485,909 | 12/1984 | Gatewood . |
| 4,611,701 | 9/1986 | Friedmann ....................... 192/110 B |
| 4,618,048 | 10/1986 | Kobayashi . |
| 4,663,983 | 5/1987 | Kobayashi et al. .............. 464/68 X |
| 4,714,449 | 12/1987 | Woerner et al. . |
| 4,760,754 | 8/1988 | Friedmann . |

FOREIGN PATENT DOCUMENTS

| | | |
|---|---|---|
| 3410953 | 5/1985 | Fed. Rep. of Germany ........ 464/66 |
| 3627784 | 7/1987 | Fed. Rep. of Germany ... 192/106.2 |
| 3642877 | 7/1987 | Fed. Rep. of Germany . |
| 2571461 | 8/1985 | France . |
| 2593252 | 7/1987 | France . |
| 56-6676 | 2/1981 | Japan . |
| 59-108848 | 7/1984 | Japan . |
| 59-113548 | 7/1984 | Japan . |
| 60-109635 | 6/1985 | Japan . |
| 61-23542 | 2/1986 | Japan . |
| 61-23543 | 2/1986 | Japan . |
| 61-23544 | 2/1986 | Japan . |
| 61-52423 | 3/1986 | Japan . |
| 61-59024 | 3/1986 | Japan . |
| 61-59040 | 3/1986 | Japan . |
| 2103760 | 7/1982 | United Kingdom . |
| 2157801 | 10/1985 | United Kingdom ................... 464/68 |
| 2160296 | 12/1985 | United Kingdom . |
| 2163524 | 2/1986 | United Kingdom . |
| 2171174 | 8/1986 | United Kingdom ............. 192/106.2 |
| 2180322 | 3/1987 | United Kingdom ................... 464/68 |
| 2186344 | 8/1987 | United Kingdom . |

OTHER PUBLICATIONS

Flywheel Damper Reduces Low Speed Diesel Noise and Vibrations, 372 Automotive Engineering 93 (1985) Jan., No., Dallas, TX, U.S.A., vol. 93, No. 1, p. 85.
Shock and Vibration Hand Book, vol. 2, McGraw Hill-#30 Theory of Vibration Isolation, Charles E. Crede & Jerome E. Ruzicka, pp. 1–17.

Primary Examiner—Daniel P. Stodola
Attorney, Agent, or Firm—Cushman, Darby & Cushman

[57] ABSTRACT

A flywheel device with a torsional damper having a first spring mechanism with a synthetic spring constant K1 and a second spring mechanism with a synthetic spring constant K2, arranged in series with each other as a spring combination. The second spring mechanism is controlled so as to be changed in operation between effective and ineffective states by a second spring mechanism operation controlling device. Thus, the vibrational characteristic of the flywheel device includes two characteristics, that is, spring constant K1 and spring constant K3 which is a synthesis of the spring constants K1 and K2. When the rotational speed of the flywheel device passes through the resonance speed of the vibrational characteristic with spring constant K1, the characteristic of the flywheel device is shifted to spring constant K3 and, as a result, there is no notable resonance speed throughout the entire range of rotational speeds. Due to this shift mechanism, it is not necessary to provide a continuously sliding friction mechanism against the flywheel device. Further, due to this omission of the continuously sliding friction mechanism, the torque variation absorbing effect at the standard range of rotational speeds is greatly improved.

17 Claims, 12 Drawing Sheets

FLYWHEEL WITH A TORSIONAL DAMPER

BACKGROUND OF THE INVENTION

1. Field of the Invention

The present invention relates to flywheels and, more particularly, to a flywheel that can change vibrational behavior, thereby suppressing resonance and improving torque variation absorbing effects.

2. Description of the Related Art

Flywheels which comprise driving and driven side flywheels, a spring mechanism for connecting the driving and driven side flywheels, and a friction mechanism are well known, as shown, for example, in U.S. Pat. Nos. 4,468,207, 4,274,524, 4,351,168, 2,042,570, 4,445,876, 2,729,079, 2,437,577, 4,663,983, 4,220,233, and 4,002,043; GB-A-2,000,257; DE-A-2,926,012; Automotive Engineering, vol. 93, page 85; Japanese Uitility Model Publications SHO 61-23542, SHO 61-23543, SHO 61-23544, SHO 59-113548, SHO 59-108848, and SHO 56-6676; and Japanese Patent Publications SHO 61-59040, SHO 61-59024, SHO 61-52423 and SHO 60-109635. The Shock and Vibration Hand Book, Vol. 2, McGraw Hill discloses various vibration isolation systems. However, these systems do not relate to fly wheels.

The prior art flywheels have a single kind of vibrational characteristic produced by a single kind of spring mechanism, even if the spring mechanism itself includes a plurality of coil springs provided in series or in parallel with each other. The single kind of vibrational characteristic causes the flywheel to have a single first mode resonance speed throughout the entire range of engine speeds. The resonance speed is usually set lower than the idling speed of the engine. As a result, when the engine speed passes through the resonance speed during a start-up or stopping of the engine, the torsional vibration of the flywheel will be amplified. To suppress the amplification in the torsional vibration, a continuously sliding friction mechanism (often called as a hysteresis mechanism) which continuously slides through the entire range of the engine speeds is disposed between the driving and driven side flywheels.

However, there are two problems with the above-described flywheels. One problem is that a considerably large resonance remains at the resonance speed even if the friction mechanism is provided, because the characteristic of the flywheel is determined more by the spring mechanism than by the friction mechanism. The other problem is that the friction mechanism deteriorates the acceleration transmittance rate (which corresponds to a damping characteristic of the flywheel) in the standard range of engine speeds above the idling speed. This is because the frictional force due to the sliding friction mechanism exists over the entire range of engine speeds and because temporary sticking frequently occurs in the friction mechanism.

Another U.S. patent application, Ser. No. 07/93,573 filed Sept. 4, 1987 relates to a flywheel designed to overcome the deficiencies of the above-described flywheel structure. However, as will become more apparent below, that application presents a structurally different solution to the problems of the prior art flywheels than the present invention.

SUMMARY OF THE INVENTION

An object of the invention is to provide a flywheel device with at least two vibrational characteristics different from each other so that the vibrational system can automatically change its vibrational characteristic from one characteristic to the other while passing through the resonance speed of the one characteristic to thereby suppress the resonance without using a continuously sliding friction mechanism. Another object of the invention is to provide a flywheel device which does not include a continuously sliding friction mechanism to thereby improve its torque variation absorbing effect at a standard range of engine speeds.

The above-mentioned objects are achieved by a flywheel device in accordance with the present invention, which comprises: a driving side flywheel and a driven side flywheel which have a common rotational axis and are rotatable relative to each other; a control plate interposed between the driving and driven side flywheels so as to be rotatable relative to the driving and driven side flywheels; a first spring mechanism interposed between the control plate and one of the driving and driven side flywheels so as to extend in a circumferential direction of the flywheel device; a second spring mechanism interposed between the control plate and the other of the driving and driven side flywheels so as to extend in the circumferential direction of the flywheel, the second spring mechanism being arranged in series with the first spring mechanism as a spring combination; and a device, provided against the second spring mechanism, for controlling an operation of the second spring mechanism such that when a torque acting on the flywheel device is less than or equal to a predetermined value, the second spring mechanism is fixed in deformation and such that when a torque acting on the flywheel device is greater than the predetermined value, the second spring mechanism can change in deformation.

When the rotational speed of the device is in a standard range of engine speeds above the idling speed, the torques acting on the control plate are usually small and do not exceed the predetermined torque of the flywheel device Under this state, the second spring mechanism is maintained ineffective and the relative position between the control plate engaging one end of the second spring mechanism and the flywheel engaging the other end of the second spring mechanism is fixed. Thus, no sliding, frictional force operates in the flywheel device even if a friction mechanism is provided in parallel with the second spring mechanism. Under this state of no friction, only the first spring mechanism operates to effectively damp the torque variations caused between the driving and driven side flywheels. Because there is no sliding, frictional force in the most frequently used range of engine speeds, that is, at a standard range of engine speeds, torque variation absorbing effects are improved in accordance with the invention.

During a start-up or stopping of the engine, the rotational speed of the flywheel device has to pass through the resonance speed of the first spring mechanism. When the rotational speed approaches the resonance speed of the vibrational system with the first spring mechanism (having, for example, a spring constant K1), the amplitude of relative rotation between the driving and driven side flywheels will gradually increase and thus torques acting on the device will increase. When the torque finally exceeds the predetermined torque, the second spring mechanism (having, for example, a spring constant K2) begins to operate, and the characteristic of the flywheel device is momentarily shifted to a vibrational system with a synthetic characteristic of the first and second spring mechanisms having a spring constant K3 (determined by an equation: $1/K3 = 1/K1 + 1/K2$). This vibrational system having the spring constant K3 has its resonance speed (K3 resonance speed) naturally different from the resonance speed of the vibrational system having the spring constant K1 (K1 resonance speed), because K2 is not zero. Accordingly, the flywheel device can pass through and jump the K1 resonance speed of the vibrational system with the spring constant K1 without being amplified in vibration. This amplification suppression effect is greater than that due to damping through a continuously acting frictional force. When the speed of the flywheel device having the spring constant K3 has jumped the resonance speed of the vibrational system having the spring constant K1 (K1 resonance speed) and changes away from the K1 resonance speed, the amplitude of relative rotation between the driving and driven side flywheels gradually decreases. Thus, the torque acting on the flywheel device quickly decreases so that the friction mechanism stops its slipping and the second spring mechanism stops its operation. As a result, the flywheel device again operates according to the vibrational system having the spring constant K1. This means that the flywheel device according to the present invention does not have a notable resonance speed over the entire range of engine speeds and that the resonance of the device is decreased to a very low level in comparison with the prior art flywheel having a single vibrational characteristic which has a single resonance speed over the entire range of engine speeds.

BRIEF DESCRIPTION OF THE DRAWINGS

The above and other objects, features and advantages of the present invention will become apparent and will be more readily appreciated from the following detailed description of the preferred exemplary embodiments of the invention taken in conjunction with the accompanying drawings, in which.

DETAILED DESCRIPTION OF THE PREFERRED EMBODIMENTS

First, structures common to each specifically discussed embodiment (three) will be explained referring to, for example, FIGS. 1-10.

Figure 1:
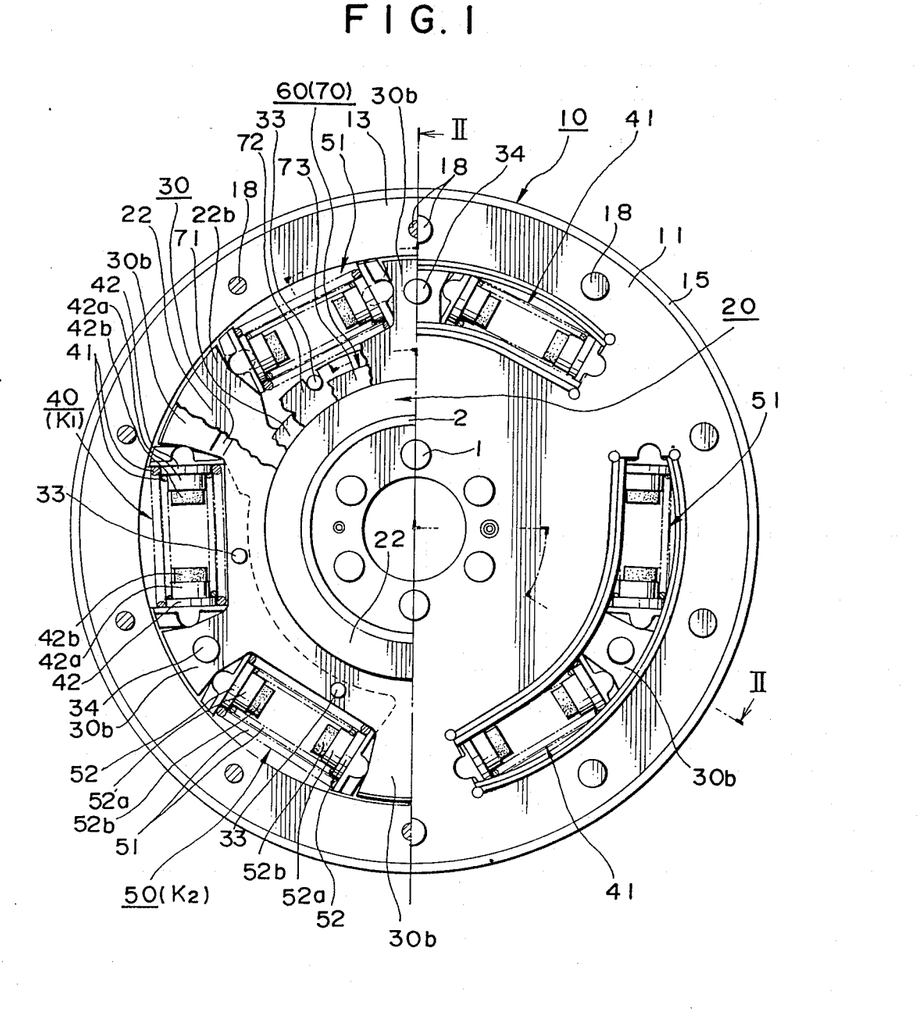
FIG. 1 is an elevational view of a flywheel device with a torsional damper in accordance with the first embodiment of the present invention.
Figure 2:
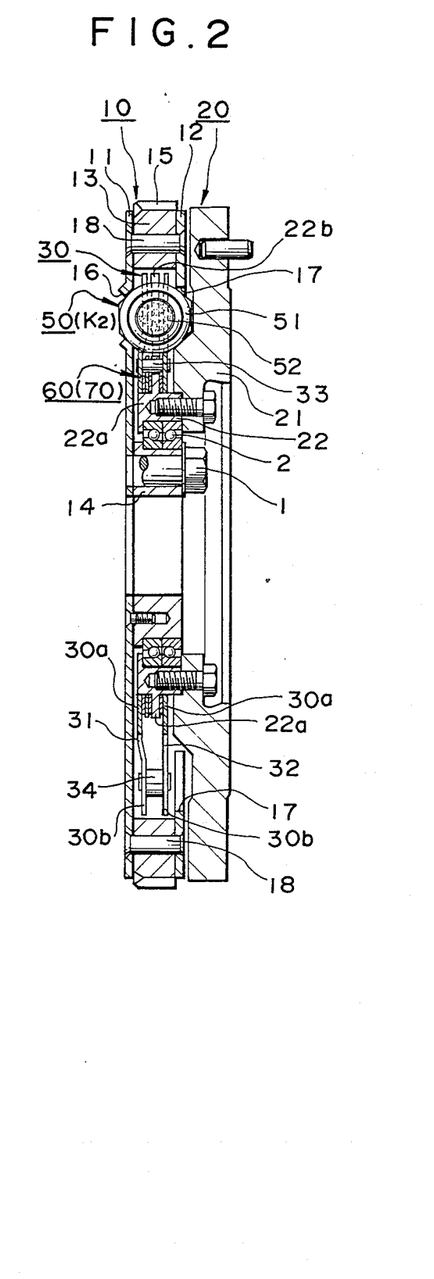
FIG. 2 is a cross-sectional view of the flywheel device of FIG. 1 taken along line II—II of FIG. 1.
Figure 3:
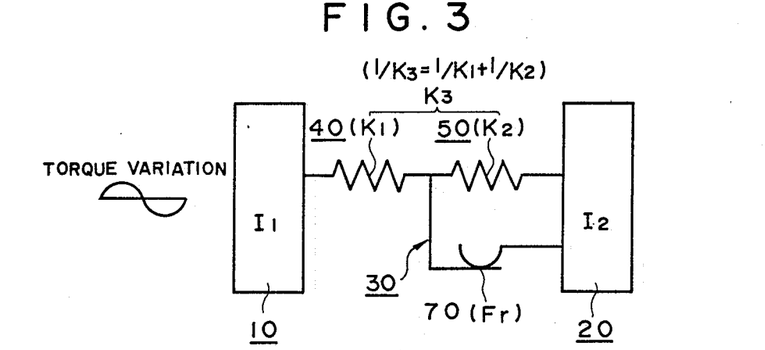
FIG. 3 is a system diagram illustrating a vibrational system of the flywheel device according to the first embodiment of the present invention.

As shown in FIG. 3, a flywheel device with a torsional damper generally comprises a driving side flywheel 10 having a moment of inertia I1 and a driven side flywheel 20 having a moment of inertia I2 which is compatible with moment of inertia I1, a control plate 30, a first spring mechanism 40 having a synthetic spring constant K1, a second spring mechanism 50 having a synthetic spring constant K2, and a second spring mechanism operation control device 60 (see FIGS. 1 and 2). As shown in FIGS. 1 and 2, driving side flywheel 10 is coupled to an engine crankshaft (not shown) by a set bolt 1 and driven side flywheel 20 is coupled to a power train (not shown) of a vehicle.

As shown in FIGS. 1 and 2, driving side flywheel 10 and driven side flywheel 20 have a common rotational axis which defines a rotational axis of the flywheel device and are arranged so as to be rotatable relative to each other. Control plate 30 is interposed between the driving and driven side flywheels 10 and 20 so as to be rotatable relative to the driving and driven side flywheels 10 and 20 around the rotational axis of the flywheel device. First spring mechanism 40 is interposed between control plate 30 and one (for example, driving side flywheel 10) of the driving and driven side flywheels 10 and 20 so as to extend in a circumferential direction of the flywheel device. Second spring mechanism 50 is interposed between control plate 30 and the other (for example, driven side flywheel 20) of the driving and driven side flywheels 10 and 20 so as to extend in the circumferential direction of the flywheel device.

Second spring mechanism 50 is arranged in series with first spring mechanism 40 as a spring arrangement. Second spring mechanism operation controlling device 60 is provided against second spring mechanism 50 so as to control operation of second spring mechanism 50 such that when a torque acting on the flywheel device is less than or equal to a predetermined value, second spring mechanism 50 is fixed in deformation and such that when a torque acting on the flywheel device is greater than the predetermined value, second spring mechanism 50 can change in deformation. Second spring mechanism operation controlling device 60 can be varied in accordance with the three embodiments of the present invention, as will be described in detail hereinafter.

As shown in FIG. 1, first spring mechanism 40 comprises at least one first coil spring 41 extending in the circumferential direction of the flywheel device and spring seats 42 which are disposed at ends of first coil spring 41. Similarly, second spring mechanism 50 comprises at least one second coil spring 51 extending in the circumferential direction of the flywheel device and spring seats 52 which are disposed at ends of second coil spring 51. Spring seats 42 and 52 disposed at the ends of first and second coil springs 41 and 51, respectively, comprise hard seat portions 42a and 52a, respectively, and elastic cushions 42b and 52b, respectively, attached to hard seat portions 42a and 52a so as to face each other. In any one of the three embodiments, first spring mechanism 40 includes three first coil springs 41, and second spring mechanism 50 includes three second coil springs 51. First coil springs 41 are arranged in parallel with each other as a spring arrangement. Similarly, second coil springs 51 are arranged in parallel with each other as a spring arrangement. The spring constant K1 of first spring mechanism 40 is a synthesis of the spring constants of all the first coil springs 41 and the spring constant K2 of second spring mechanism 50 is a synthesis of the spring constants of all the second coil springs 51. When the first coil spring 41 is compressed to a great extent and cushions 42b disposed at the opposite ends of first coil spring 41 are brought into contact with each other, the spring constant of first spring mechanism 40 is changed to a greater spring constant determined by the elasticity of cushions 42b. Similarly, second coil spring 51 is compressed to a great extent and cushions 52b disposed at the opposite ends of second coil spring 51 are brought into contact with each other, the spring constant of second spring mechanism 50 is changed to a greater spring constant determined by the elasticity of cushions 52b. First spring mechanism 40 and second spring mechanism 50 construct a torsional damper.

Control plate 30 which is arranged coaxially with respect to the driving and driven side flywheels 10 and 20 and is mounted so as to be rotatable relative to the driving and driven side flywheels 10 and 20 comprises an annular portion 30a and a plurality of arms 30b which extend radially outwardly from annular portion 30a. Arms 30b detachably engage with the first and second spring mechanisms 40 and 50 at spring seats 42 and 52, respectively. Control plate 30 includes two plate elements 31 and 32 which are arranged substantially parallel to each other and are connected to each other by rivets 33 and 34 so as to rotate together. Rivet 33 which is located radially inside rivet 34 is disposed so as to engage with a thrust plate 72 of a friction mechanism 70.

As shown in FIGS. 1, 2, 6 and 7, driving side flywheel 10 comprises an outer ring 13 including a ring gear 15, an inner ring 14 disposed radially inside and spaced from outer ring 13, and a pair of driving plates 11 and 12 disposed on opposite sides of outer ring 13. Outer ring 13 is fixed to driving plates 11 and 12 by rivet 18, and inner ring 14 is fixed to driving plate 11. Driving plates 11 and 12 have a circumferentially elongated opening 16 or a circumferentially elongated slot 17 for detachably engaging first spring mechanism 40 under an accelerating condition and for detachably engaging second spring mechanism 50 under a decelerating condition. More particularly, driving plate 11 has a plurality of openings 16 formed therein and driven plate 12 has a plurality of slots 17 formed therein. First spring mechanism 40 detachably engages circumferential ends of openings 16 and slots 17.

Figure 8:
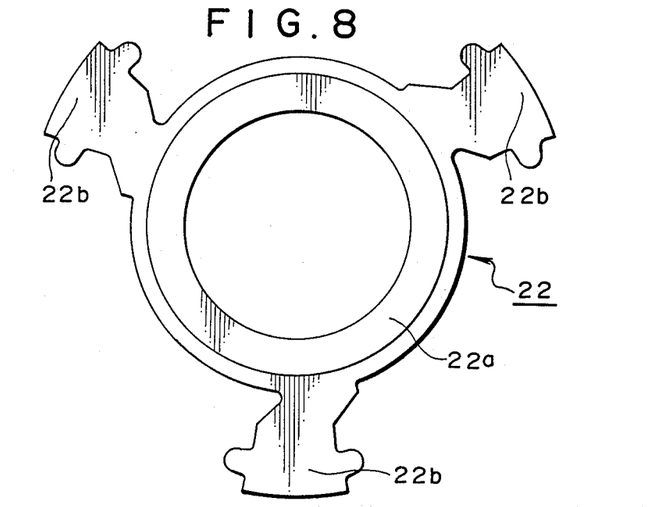
FIG. 8 is an elevational view of a driven plate used in the flywheel device according to the first embodiment of the present invention.
Figure 9:
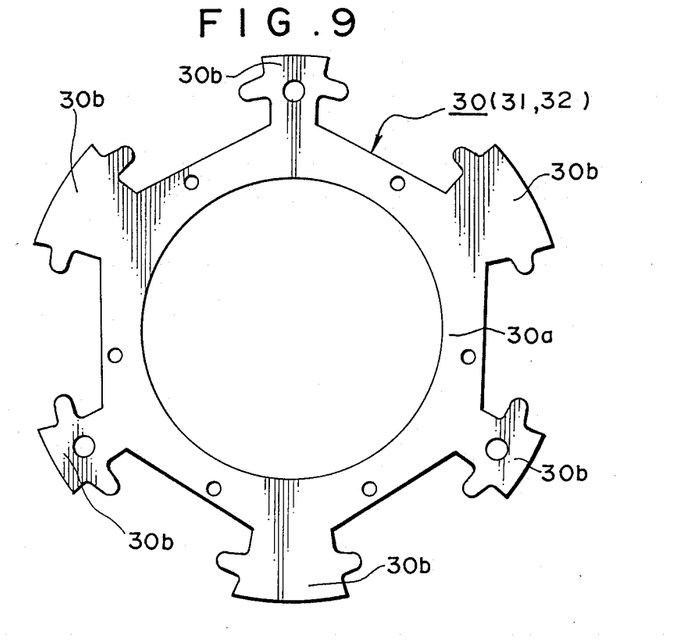
FIG. 9 is an elevational view of a control plate used in the flywheel device according to the first embodiment of the present invention.

As shown in FIGS. 1, 2 and 8, driven side flywheel 20 which is coaxial with respect to driving side flywheel 10 comprises a flywheel body 21 and a driven plate 22. Flywheel body 21 is arranged so as to oppose driving side flywheel 10 in the axial direction of the flywheel device. Flywheel body 21 has a diameter substantially equal to a diameter of driving side flywheel 10. Driven plate 22 is fixed to flywheel body 21 so that they rotate together. Driven plate 22 is mounted so as to be rotatable relative to driving side flywheel 10 via a bearing 2. As shown in FIG. 8, driven plate 22 comprises an annular portion 22a and a plurality of arms 22b for detachably engaging second spring mechanism 50 under an accelerating condition and for detachably engaging first spring mechanism 40 under a decelerating condition. Arms 22b extend radially outwardly from annular portion 22a and are spaced from each other in the circumferential direction of the flywheel device.

The distinguishing features of the three disclosed embodiments will now be explained.

Figure 10:
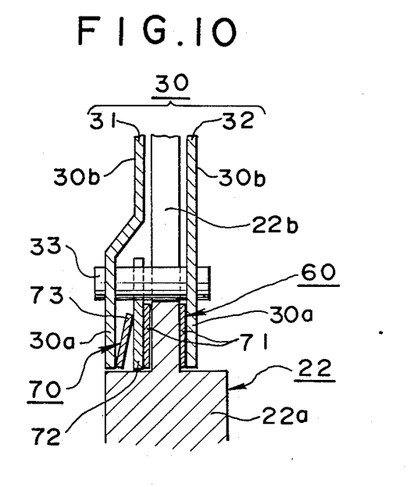
FIG. 10 is a cross-sectional view of a friction mechanism used in the flywheel device according to the first embodiment of the present invention.
Figure 11:
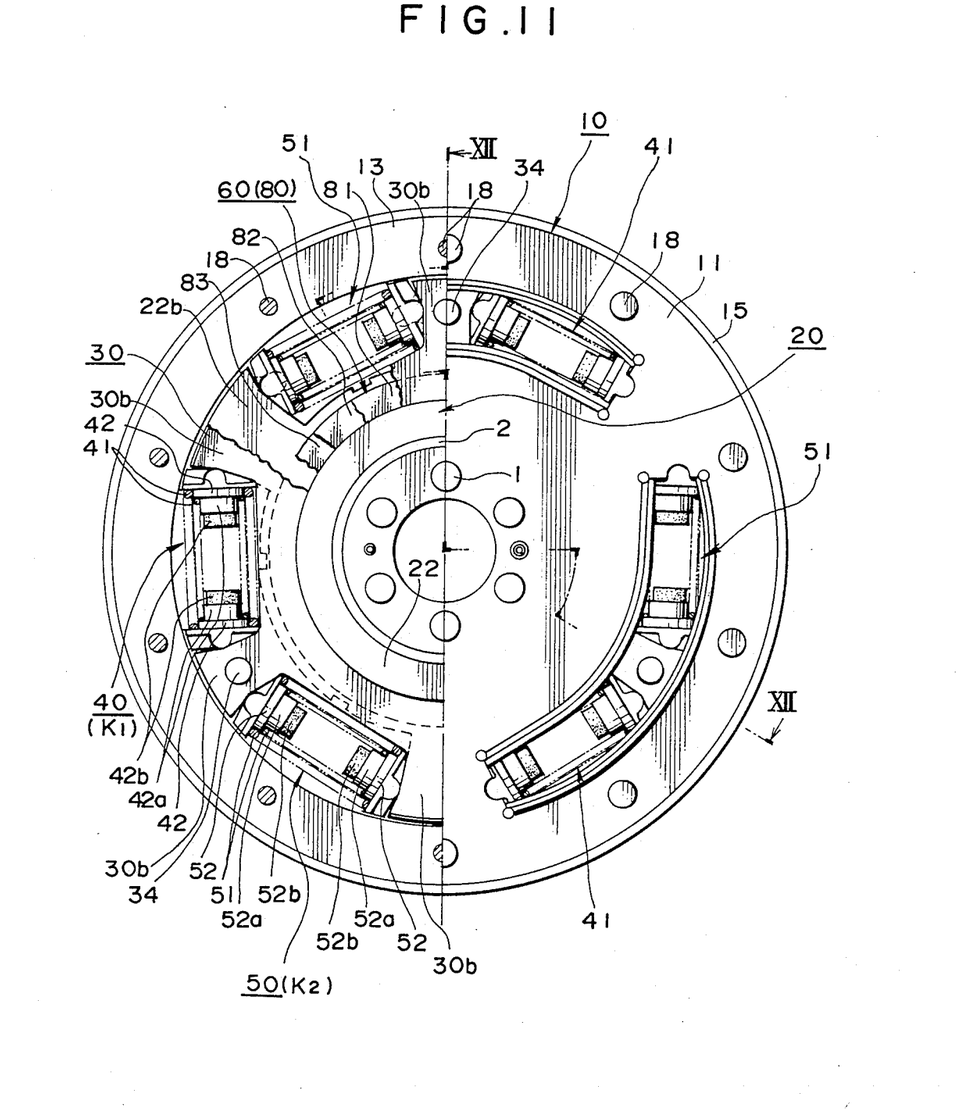
FIG. 11 is an elevational view of a flywheel device with a torsional damper in accordance with the second and third embodiments of the present invention.
Figure 12:
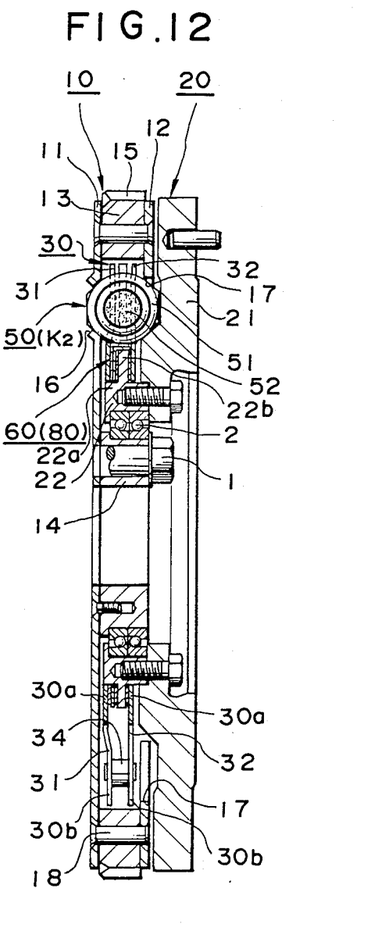
FIG. 12 is a cross-sectional view of the flywheel device of FIG. 11 taken along line XII—XII of FIG. 11.

In the first embodiment, as shown in FIGS. 1 to 10, second spring mechanism operation controlling device 60 comprises a friction mechanism 70 interposed between control plate 30 and one (for example, driven side flywheel 20) of the driving side and driven side flywheels 10 and 20. As shown in FIG. 3, friction mechanism 70 is arranged the parallel with second spring mechanism 50 as a vibrational system. As shown in FIG. 10 friction mechanism 70 comprises at least one (for example, two) thrust lining 71 constructed of abrasive material, a thrust plate 72 comprising a substantially annular plate, and a cone spring 73 for producing a specified and predetermined axial force to thereby specify the predetermined torque. Thrust lining 71, thrust plate 72 and cone spring 73 are disposed between control plate 30 and driven side flywheel 20 in the axial direction of the flywheel device.

FIG. 3 illustrates a schematic vibrational system of the flywheel device of the first embodiment of the present invention. The two inertia moments I1 and I2 which correspond to the inertia moments of driving side flywheel 10 and driven side flywheel 20, respectively, are connected to each other via the first and second spring mechanisms 40 and 50 which are arranged in series with each other as a spring combination. The first and second spring mechanisms 40 and 50 are connected to each other via control plate 30. Friction mechanism 70 with a predetermined frictional force Fr for defining the predetermined torque is interposed between control plate 30 and one (for example, driven side flywheel 20) of the driving and driven side flywheels 10 and 20, and friction mechanism 70 is arranged in parallel with second spring mechanism 50. First spring mechanism 40 includes at least one first coil spring 41 arranged in parallel with each other and has a synthetic spring constant K1. For example, in case of three first coil springs 41, each first coil spring 41 has a spring constant of K1/3 and the synthetic spring constant of the three first coil springs 41 is K1. Similarly, second spring mechanism 50 includes at least one second coil spring 51 arranged in parallel with each other and has a synthetic spring constant K2.

Operation of the flywheel device of the first embodiment with the vibrational system of FIG. 3 will now be explained with reference to FIGS. 4 and 5. FIG. 5 illustrates an engine (or flywheel device) speed acceleration transmittance rate characteristic of the vibrational system of FIG. 3. In a standard range of engine rotational speeds (range E of FIG. 5) and in a very low rotational speed range (range A of FIG. 5), a force acting on control plate 30 in the circumferential direction is usually smaller than the predetermined frictional force Fr of friction mechanism 70. Thus, friction mechanism 70 does not slip, and a relative position between control plate 30 and driven side flywheel 20 is fixed. Accordingly, second coil spring 51 of second spring mechanism 50 is not deformed in the circumferential direction of the flywheel device, and only first coil spring 41 of first spring mechanism 40 operates by being deformed in the circumferential direction of the flywheel device. Because no sliding, frictional force occurs in friction mechanism 70 at this time, a torque variation absorbing effect of the system is greatly improved at range E of FIG. 5. If both the first and second coil springs 41 and 51 were fixed in deformation, the driving and driven side flywheels 10 and 20 would rotate together and the acceleration transmittance rate would be 1 and no torque variation absorbing effect would be obtained. The friction mechanism of the prior art which produces a continuously acting frictional force between the driving and driven side flywheels would operate so as to tend to make the driving and driven side flywheels rotate together and would deteriorate the torque variation absorbing effect of the flywheel device. However, in the flywheel device of the present invention, because the friction mechanism 70 operates only momentarily, such deterioration of torque variation absorbing effect can be prevented. The two-dotted chain line of FIG. 5 illustrates the characteristic of the prior art flywheel device having a single kind of vibrational characteristic and the hatched portion of FIG. 5 illustrates the improvement of torque variation absorbing effects of the flywheel device of the present invention having two vibrational characteristics (vibrational systems having spring constants K1 and K3) in comparison with the prior art.

During a start-up or stopping of an engine, the rotational speed of the flywheel device passes through the resonance speed (K1 resonance speed of FIG. 5) of the vibrational system which comprises the operating first spring mechanism 40 and the inertia moments I1 and I2. When the rotational speed of the vibrational system approaches the K1 resonance speed, a torsional angle ($\theta$ of FIG. 4) between the driving and driven side flywheels 10 and 20 is gradually increased and the torque acting on the flywheel device is increased. When the increasing torque finally exceeds the predetermined torque which is determined by the frictional force Fr of friction mechanism 70, friction mechanism 70 begins to slip and second coil spring 51 of second spring mechanism 50 is deformed and operates. Second spring mechanism 50 operates in series with first spring mechanism 40 and changes the synthetic spring constant of the vibrational system of FIG. 3 from K1 to K3, where K3 is determined from the equation: $1/K3 = 1/K1 + 1/K2$. Thus, the vibrational system of FIG. 3 has two vibrational characteristics and the vibrational characteristic of the vibrational system of FIG. 3 shifts, momentarily while passing through the K1 resonance speed, from point P through region B to point Q or from point Q through region B to point P in FIG. 5, being accompanied by a sliding slippage of friction mechanism 70 at region B. Furthermore, the vibrational system of FIG. 3 changes its characteristic from spring constant K1 to spring constant K3 and can jump the K1 resonance speed without being amplified in vibration. When the rotational speed of the flywheel device changes away from the K1 resonance speed, the torque variation between the driving and driven side flywheels 10 and 20 is gradually decreased and the force acting on control plate 30 becomes less than the predetermined frictional force Fr of friction mechanism 70. Then, friction mechanism 70 stops slipping and the vibrational system again operates according to the characteristic where only first spring mechanism 40 operates. In this way, vibrational amplification during passing through the K1 resonance speed is suppressed.

Figure 4:
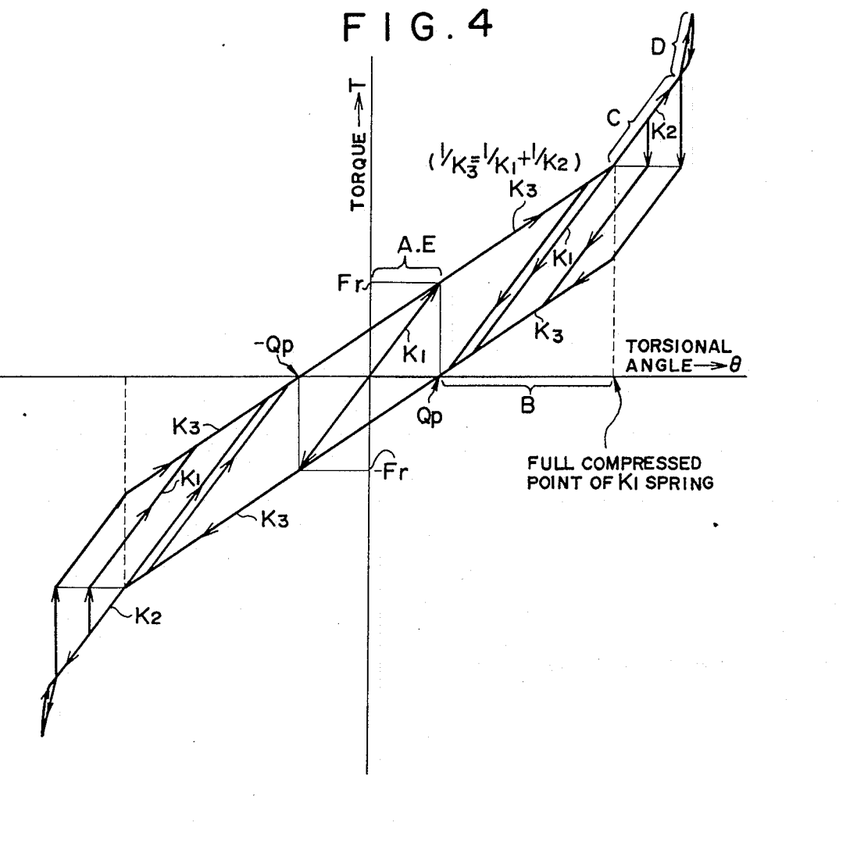
FIG. 4 is a diagram illustrating a torsional angle-torque characteristic of the flywheel device according to the first embodiment of the present invention.
Figure 5:
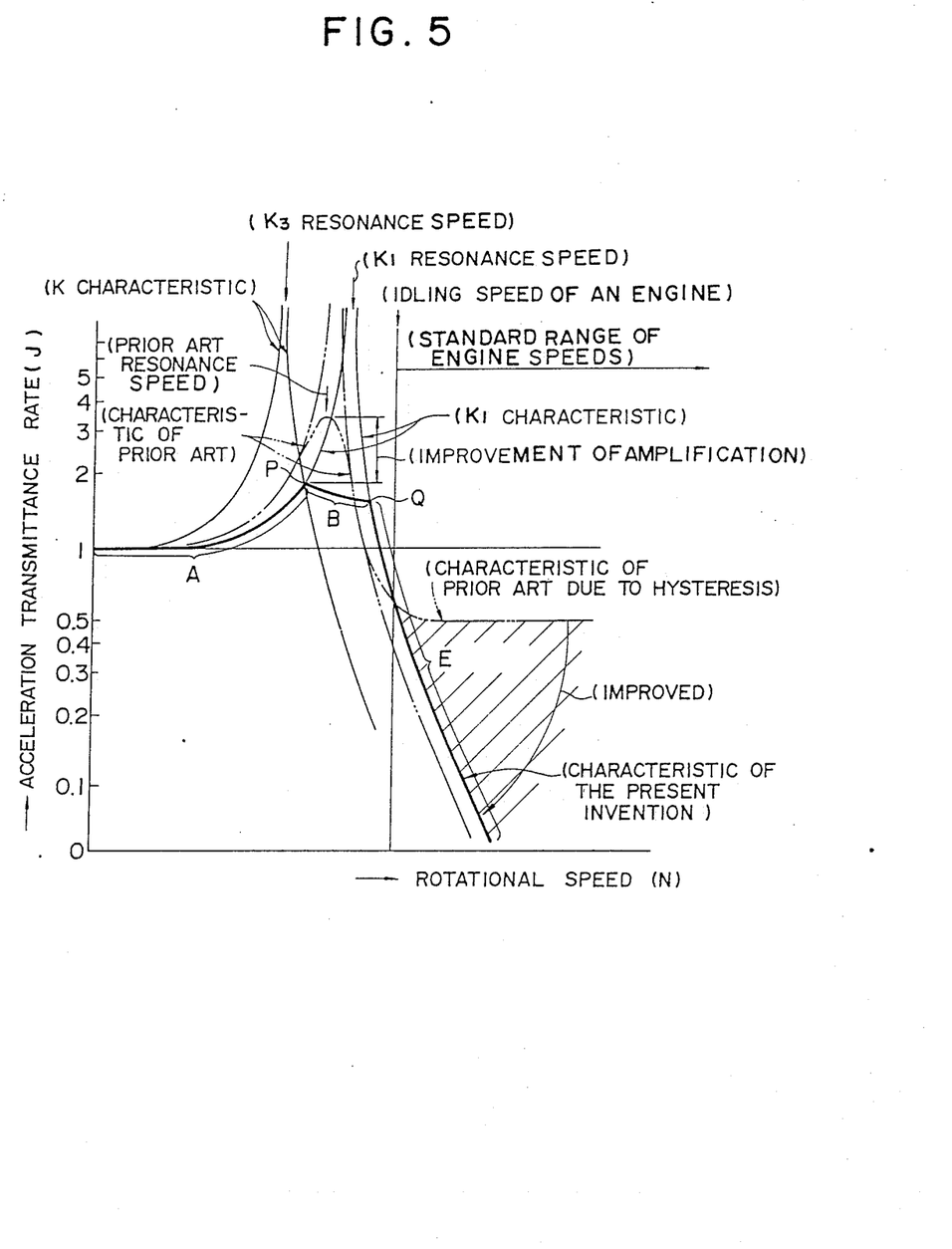
FIG. 5 is a graph illustrating a rotational speed-acceleration transmittance rate characteristic of the flywheel according to the first embodiment of the present invention, which is also applicable to second and third embodiments of the present invention.
Figure 6:
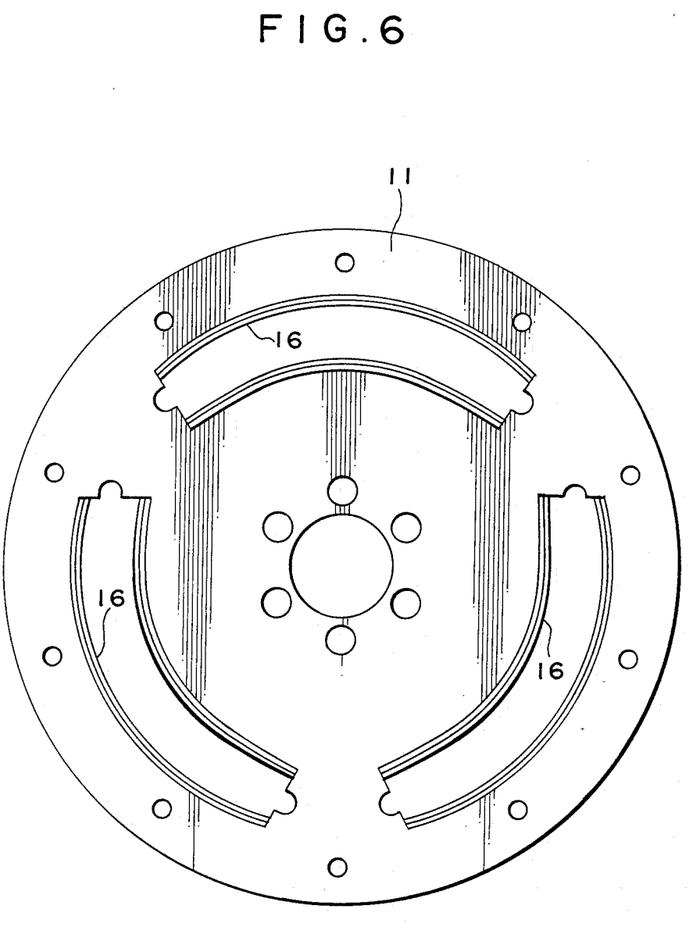
FIG. 6 is an elevational view of one of a pair of driving plates used in the flywheel devices according to the first, second and third embodiments of the present invention.
Figure 7:
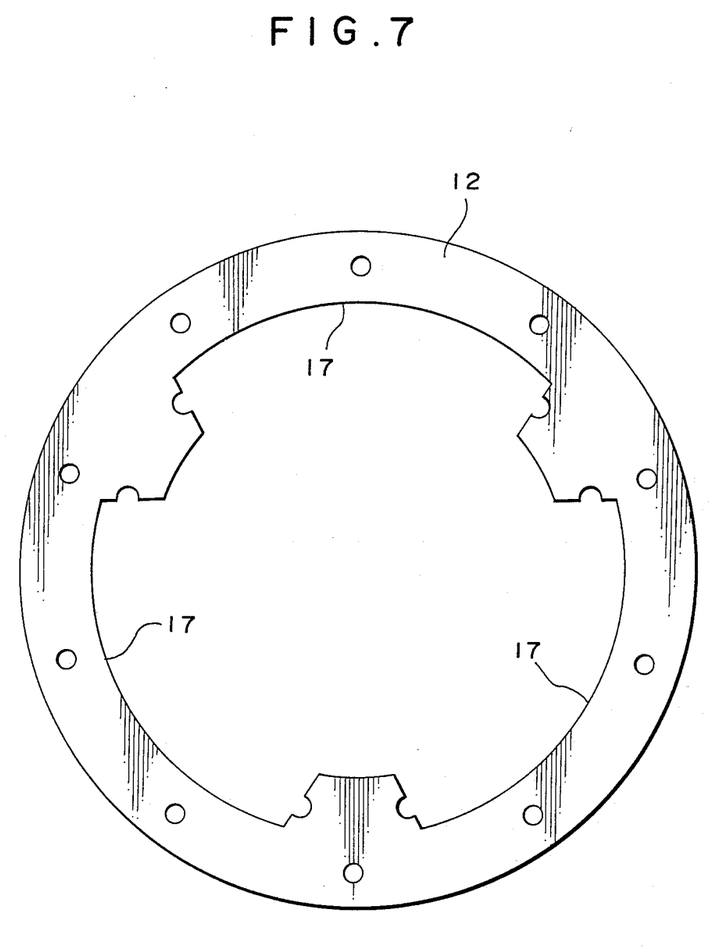
FIG. 7 is an elevational view of the other of a pair of driving plates used in the flywheel devices according to the first, second and third embodiments of the present invention.

FIG. 4 illustrates a torsional angle-torque characteristic of the vibrational system of FIG. 3. In the small torsional relative angle regions A and E, only first spring mechanism 40 acts. When the relative torsional angle $\theta$ exceeds $Q_p$ which corresponds to the predetermined frictional force Fr, friction mechanism 70 begins to slip and both the first and second spring mechanisms 10 and 20 operate. When the torsional angle $\theta$ is greatly increased at a very large torque operation, cushions 42b disposed at the opposite ends of first coil springs 41 are brought into contact with each other and the spring constant of the system is increased, as shown by range C of FIG. 4. When the torsional angle $\theta$ is further increased, cushions 52b disposed at the opposite ends of second coil spring 51 are brought into contact with each other and the spring constant of the vibrational system is greatly increased as shown by range D of FIG. 4. The characteristic of range D is accompanied by a hysteresis due to the deformation of rubber material of cushions 42b and 52b.

Next, the specific structures of the flywheel devices according t the second and third embodiments of the present invention will be explained referring to FIGS. 11 to 18. In FIGS. 11 to 18, elements corresponding to the elements of the first embodiment are denoted by the same reference numerals as those of the first embodiment and a discussion of the same will be omitted.

Figure 16:
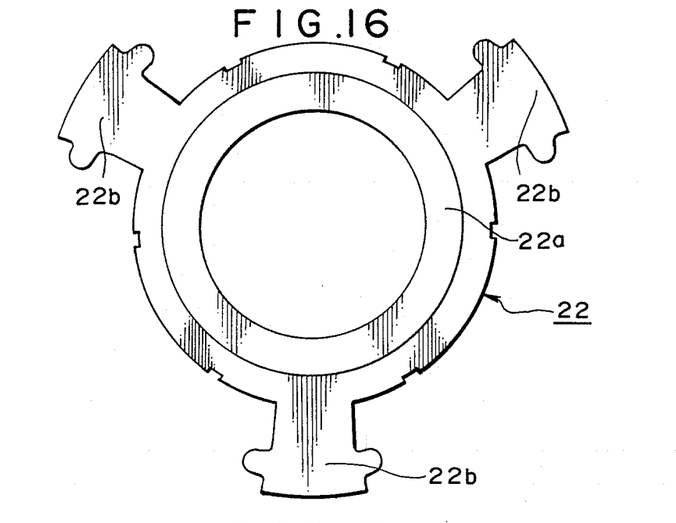
FIG. 16 is an elevational view of a driven plate used in the flywheel device according to the second and third embodiments of the present invention.
Figure 17:
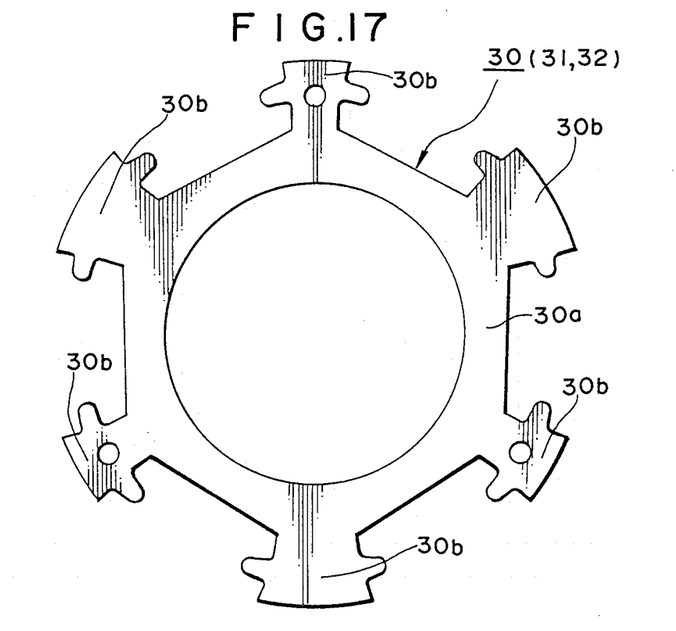
FIG. 17 is an elevational view of a control plate used in the flywheel device according to the second and third embodiments of the present invention.
Figure 18:
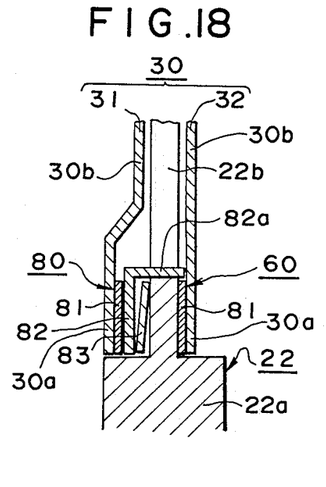
FIG. 18 is a cross-sectional view of a friction mechanism used in the flywheel device according to the third embodiment of the present invention.

In the second embodiment, second spring mechanism operation controlling device 60 comprises a member for setting second spring mechanism in a pre-compressed state. More particularly, device 60 comprises a plurality of arms 30b of control plate 30 extending radially and spaced from an adjacent one of arms 30b in the circumferential direction of the flywheel device so as to set second coil spring 51 of second spring mechanism 50 in the pre-compressed state to thereby specify the predetermined torque. The synthetic force Tp of the pre-compressed second coil springs 51 corresponding to the predetermined torque corresponds to the frictional force Fr of the first embodiment. FIGS. 16, 17 and 18 illustrate small design changes in driven plate 22, control plate 30 and a friction mechanism 80, respectively, in comparison with those of the first embodiment.

Figure 13:
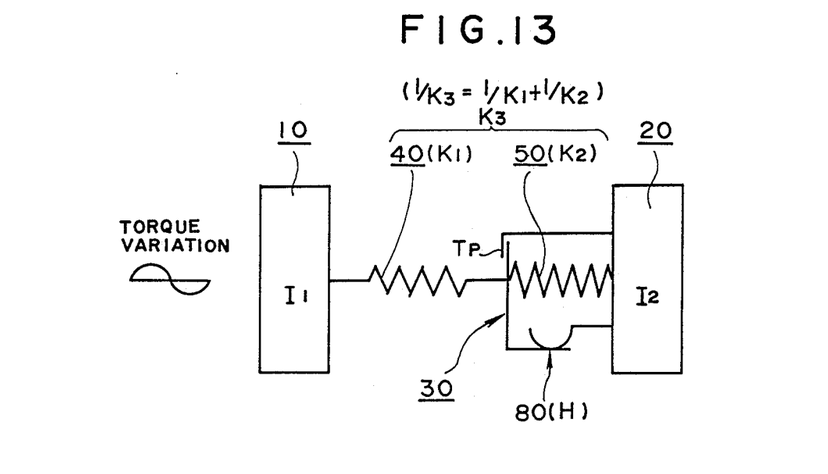
FIG. 13 is a system diagram illustrating a vibrational system of the flywheel device according to the second and third embodiments of the present invention under an accelerating condition.
Figure 14:
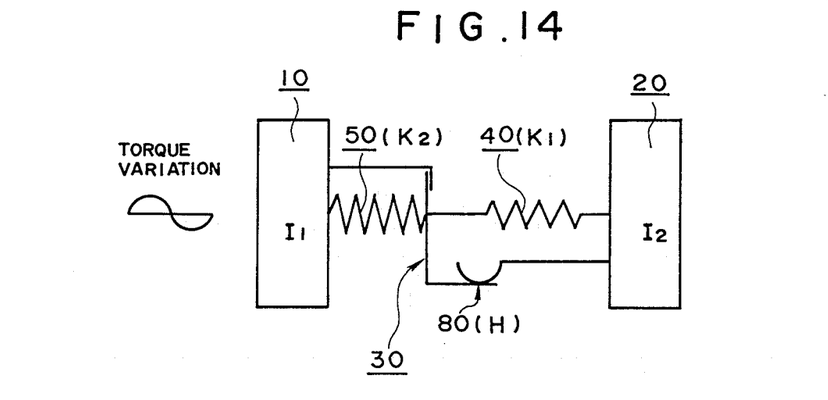
FIG. 14 is a system diagram illustrating a vibrational system of the flywheel device according to the second and third embodiments of the present invention under a decelerating condition.

FIGS. 13 and 14 illustrate the vibrational systems under an accelerating condition and under a decelerating condition, respectively, for the second embodiment. Friction mechanism 80 with the frictional force H is not needed in the second embodiment but is needed in the third embodiment.

Figure 15:
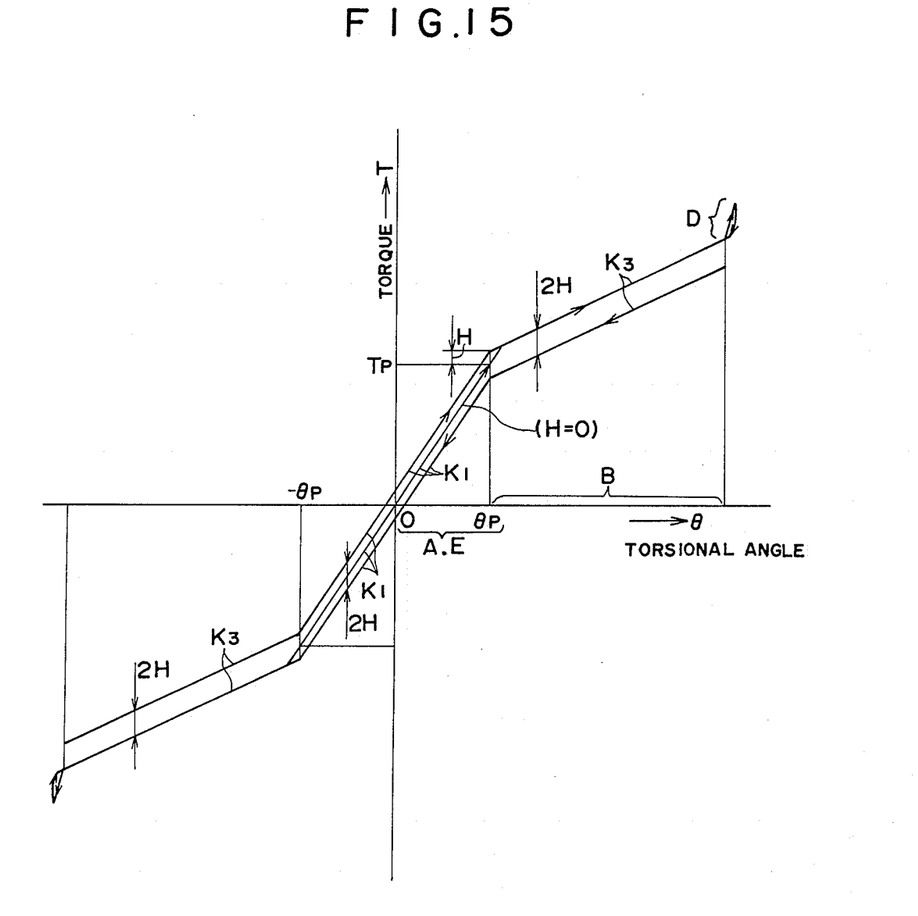
FIG. 15 is a diagram illustrating a torsional angle-torque characteristic of the flywheel device according to the second and third embodiments of the present invention.

The flywheel device whose vibrational systems are shown in FIGS. 13 and 14 has a torsional angle-torque characteristic shown in FIG. 15 and a rotational speed-acceleration transmittance rate characteristic shown in FIG. 5. Operation of the second embodiment is very similar to that of the first embodiment. In the second embodiment, the predetermined torque is determined by the synthetic pre-compression force of second spring mechanism 50, while the predetermined torque of the first embodiment is determined by the frictional force Fr of friction mechanism 70. More particularly, the second spring mechanism 50 is fixed in deformation when the torque acting on the flywheel device does not exceed the torque corresponding to the synthetic pre-compressed spring force Tp, while the second spring mechanism 50 operates when the torque acting on the flywheel device exceeds the torque corresponding to the force Tp. Thus, as with the first embodiment, an improvement in torque variation absorbing effects at region E of FIG. 5 and an improvement in vibration suppression effects at region B of FIG. 5 can be obtained. In FIG. 15, region A or E illustrates a region where only first spring mechanism 40 operates to cause a vibrational system having the spring constant K1, and region B illustrates a region where both the first and second spring mechanisms 40 and 50 operate and cause the vibrational system having the spring constant K3. Region D illustrates a region where cushions 42b and 52b are compressed.

In the third embodiment of the present invention, second spring mechanism operation controlling device 60 comprises a member (arms 30b of control plate 30) for setting second spring mechanism 50 in a pre-compressed state and friction mechanism 80 (which produces the frictional force H smaller than the frictional force Fr of the first embodiment) interposed between control plate 30 and driven side flywheel 20. Friction mechanism 80 is arranged in parallel with second spring mechanism 50 as a vibrational system. As shown in FIG. 18, friction mechanism 80 includes at least one thrust lining 81 of abrasive material, a thrust plate 82 of a substantially annular plate, and a cone spring 83 for producing the specified predetermined frictional force H. Thrust plate 82 has a lip 82a which is bent so as to engage notches, as shown in FIG. 16, which are formed in a radially outer portion of annular portion 22a of driven plate 22 and are formed by twos in number between every adjacent arms 22b of driven plate 22.

Operation of the third embodiment is the same as that of the second embodiment except that the predetermined torque of the third embodiment is a torque corresponding to the force (Tp+H) which is a summation of the synthetic pre-compressed spring force Tp of second coil springs 51 and the frictional force H, while the predetermined torque of the second embodiment is a torque corresponding to the force Tp. Thus, the second spring mechanism 50 is fixed in deformation when the torque acting on the flywheel device does not exceed the torque corresponding to the force (Tp+H), while the second spring mechanism 50 operates when the torque acting on the flywheel device exceeds the torque corresponding to the force (Tp+H). Thus, as with the first embodiment, an improvement in torque variation absorbing effects at region E of FIG. 5 and an improvement in vibration suppression effects at region B of FIG. 5 can be obtained. In FIG. 15, region A or E illustrates a region where only first spring mechanism 40 operates to cause a vibrational system having the spring constant K1, and region B illustrates a region where both the first and second spring mechanisms 40 and 50 operate and cause a vibrational system having the synthetic spring constant K3 which is accompanied by a hysteresis due to friction mechanism 80. Region D illustrates a region where cushions 42b and 52b are compressed.

Effects, common to every embodiment, according to the present invention are as follows:

Since the flywheel device has two vibrational characteristics (whose spring constants are K1 and K3, respectively,) and the vibrational characteristic of the flywheel device is shifted from spring constant K1 to spring constant K3 while passing through the resonance speed of the vibrational system having the spring constant K1, the flywheel device has no notable resonance speed throughout the entire range of engine speeds.

Since second spring mechanism operation controlling device 60 makes second spring mechanism 50 ineffective at the standard range E of rotational speeds and no sliding friction operates at the range E, an excellent torque variation absorbing effect can be obtained at range E in comparison with the prior art flywheel device which has a continuously sliding friction mechanism. Especially, because no sliding frictional force acts in the second embodiment and little frictional force acts in the third embodiment, a very satisfactory torque absorbing effect can be obtained at region E.

Since first and second spring mechanisms 40 and 50 are arranged in series with each other as a spring combination, a single kind of control plate comprising control plate 30 (which includes control plate elements 31 and 32) is sufficient to connect the two spring mechanisms 40 and 50, wherein a parallel combination of first and second spring mechanisms would require two kinds of control plates. This structure, having a single kind of control plate is effective in providing a compact flywheel device, especially in the axial direction of the flywheel device.

Although a few preferred embodiments of the present invention have been described in detail, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A flywheel device with a torsional damper comprising:
    a driving side flywheel and a driven side flywheel which have a common rotational axis and are rotatable relative to each other:
    a control plate disposed between said driving and driven side flywheels so as to be rotatable relative to said driving and driven side flywheels;

a first spring mechanism directly and detachably connected between said control plate and one of said driving and driven side flywheel so as to extend in a circumferential direction of the flywheel device, said first spring mechanism having a synthetic spring constant K1;

a second spring mechanism directly and detachably connected between said control plate and the other of said driving and driven side flywheels so as to extend in the circumferential direction of the flywheel device, said second spring mechanism being arranged in series with said first spring mechanism as a spring arrangement, said second spring mechanism having a synthetic spring constant K2; and second spring mechanism operation control means, provided against said second spring mechanism, for restricting deformation of said second spring mechanism when a torque acting between said control plate and said other flywheel is less than or equal to a predetermined value and allowing deformation of said spring mechanism when a torque acting between said control plate and said other flywheel is greater than said predetermined value.

wherein when said second spring mechanism operation control means restricts deformation of said second spring mechanism, the flywheel device has a spring constant equal to said K1, and when said second spring mechanism operation control means allows deformation of said second spring mechanism, the flywheel device has a spring constant K3, where K3 is determined by said K1 and K2 through the following equation:

$$1/K3 = 1/K1 + 1/K2.$$

2. The flywheel device according to claim 1, wherein said second spring mechanism operation controlling means comprises a friction mechanism disposed between said control plate and said the other flywheel, said friction mechanism being in parallel with said second spring mechanism as a vibrational system, a predetermined friction force of said friction mechanism being determined so that said friction mechanism begins sliding as soon as a torque acting between said control plate and said the other flywheel exceeds said predetermined value.

3. The flywheel device according to claim 1, wherein said second spring mechanism operation controlling means comprises means for setting said second spring mechanism in a pre-compressed state, a pre-compression of said second spring mechanism by said setting means being determined so that said second spring mechanism begins to be further compressed as soon as a torque acting between said control plate and said the other flywheel exceeds said predetermined value.

4. The flywheel device according to claim 1, wherein said second spring mechanism operation controlling means comprises:

means for setting said second spring mechanism in a pre-compressed state; and a friction mechanism disposed between said control plate and said the other flywheel, said friction mechanism being in parallel with said second spring mechanism as a vibrational system, a combination of a pre-compression of said second spring mechanism by said setting means and a predetermined frictional force of said friction mechanism being determined so that said second spring mechanism begins to be further compressed and said friction mechanism beings sliding as soon as a torque acting between said control plate and said the other flywheel exceeds said predetermined value.

5. The flywheel device according to any one of claims 2, 3 and 4, wherein said one flywheel comprises said driving side flywheel and said the other flywheel comprises said driven side flywheel.

6. The flywheel device according to claim 2, wherein said friction mechanism comprises at least one thrust lining constructed of abrasive material, a thrust plate comprising a substantially annular plate, and a cone spring for producing a specified axial force to thereby define said predetermined torque, said thrust lining, said thrust plate, and said cone spring being disposed between said control plate and said other flywheel in an axial direction of the flywheel device.

7. The flywheel device according to claim 3, wherein said means for setting said second spring mechanism in a pre-compressed state comprises a plurality of arms of said control plate extending radially and spaced from an adjacent one of said arms in the circumferential direction of the flywheel device so as to set a second coil spring of said second spring mechanism in a pre-compressed state to thereby specify said predetermined torque.

8. The flywheel device according to claim 4, wherein said means for setting said second spring mechanism in a pre-compressed state comprises a plurality of arms of said control plate extending radially and spaced from an adjacent one of said arms of said control plate in the circumferential direction of the flywheel device so as to set a second coil spring of said second spring mechanism in a pre-compressed state to thereby specify said predetermined torque, and wherein said friction mechanism comprises a thrust lining constructed of abrasive material, a thrust plate comprising a substantially annular plate, and a cone spring for producing a axial force.

9. The flywheel device according to claim 1, wherein said first spring mechanism comprises at least one first coil spring and spring seats which are disposed at opposite ends of said first coil spring, and said second spring mechanism comprises at least one second coil spring and spring seats which are disposed at opposite ends of said second coil spring.

10. The flywheel device according to claim 9, wherein said spring seats disposed at the ends of said first and second coil springs, respectively, comprise hard seat portions and elastic cushions attached to said hard seat portions so as to face each other.

11. The flywheel device according to claim 9, wherein said first spring mechanism includes three first coil springs and said second spring mechanism includes three second coil springs.

12. The flywheel device according to claim 1, wherein said control plate comprises an annular portion and a plurality of arms which extend radially outwardly from said annular portion of said control plate, said arms of said control plate detachably engaging with said first and second spring mechanisms.

13. The flywheel device according to claim 12, wherein said control plate includes two plate elements which are arranged substantially parallel to each other and connected by a rivet so as to rotate together.

14. The flywheel device according to claim 1, wherein said driving said flywheel comprises:

an outer ring including a ring gear;

an inner ring disposed radially inside and radially spaced from said outer ring; and a pair of driving plates disposed on opposite sides of said outer ring, said outer ring being coupled to said pair of driving plates and said inner ring being fixed to one of said pair of driving plates, said pair of driving plates including means for detachably engaging said first spring mechanism under an accelerating condition and for detachably engaging said second spring mechanism under a decelerating condition.

15. The flywheel device according to claim 14, wherein means for detachably engaging said first and second spring mechanisms comprises at least one circumferentially elongated opening formed in one of said pair of driving plates and at least one circumferentially elongated slot formed in the other of said pair of driving plates, said first and second spring mechanisms detachably engaging circumferential ends of said opening and said slot.

16. The flywheel device according to claim 1, wherein said driven side flywheel comprises:
a flywheel body arranged so as to oppose said driving side flywheel in an axial direction of the flywheel device; and
a driven plate fixed to said flywheel body, said driven plate comprising means for detachably engaging said second spring mechanism under an accelerating condition and for detachably engaging said first spring mechanism under a decelerating condition.

17. The flywheel device according to claim 16, wherein said driven plate comprises an annular portion and a plurality of arms which extend radially outwardly from said annular portion and comprises said means for detachably engaging said first and second spring mechanisms.

* * * * *